(12) United States Patent
Rothman et al.

(10) Patent No.: US 8,370,667 B2
(45) Date of Patent: Feb. 5, 2013

(54) SYSTEM CONTEXT SAVING BASED ON COMPRESSION/DECOMPRESSION TIME

(75) Inventors: Michael A. Rothman, Puyallup, WA (US); Palsamy Sakthikumar, Puyallup, WA (US); Vincent J. Zimmer, Federal Way, WA (US); Mallik Bulusu, Olympia, WA (US); Robert C. Swanson, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 225 days.

(21) Appl. No.: 12/976,514

(22) Filed: Dec. 22, 2010

(65) Prior Publication Data

US 2012/0166840 A1    Jun. 28, 2012

(51) Int. Cl.
*G06F 1/32* (2006.01)
(52) U.S. Cl. .......................................... 713/323; 710/68
(58) Field of Classification Search ............... 710/68; 713/323
See application file for complete search history.

(56) References Cited

U.S. PATENT DOCUMENTS

| 6,611,919 | B1 * | 8/2003 | Matsuya et al. ............... 713/320 |
| 8,145,833 | B1 * | 3/2012 | Duan ............................ 711/104 |
| 2005/0066158 | A1 | 3/2005 | Mowery et al. |
| 2007/0288687 | A1 | 12/2007 | Panabaker |
| 2008/0133903 | A1 | 6/2008 | Sun et al. |
| 2008/0168438 | A1 | 7/2008 | Meijer et al. |

FOREIGN PATENT DOCUMENTS

WO    WO2012/087457 A1    6/2012

OTHER PUBLICATIONS

International Search Report and Written Opinion, mailed May 29, 2012, from PCT Application No. PCT/US2011/061049, 9 pages.
"Advanced Configuration and Power Interface Specification", Hewlett-Packard Corporation, Intel Corporation, Microsoft Corporation, Phoenix Technologies Ltd., Toshiba Corporation, Revision 4.0a, Apr. 5, 2010, 731 pages.

* cited by examiner

*Primary Examiner* — Albert Wang
(74) *Attorney, Agent, or Firm* — Schwabe, Williamson & Wyatt, P.C.

(57) ABSTRACT

A method and apparatus for improving the resume time of a platform. In one embodiment of the invention, the context of the platform is saved prior to entering an inactive state of the platform. When the platform is switched back to an active state, it reads the saved context and restores the platform to its original state prior to entering the inactive state. In one embodiment of the invention, the platform determines whether it should compress the saved context before storing it in a non-volatile memory based on the operating condition of the platform. This allows the platform to select the optimum method to allow faster resume time of the platform.

21 Claims, 3 Drawing Sheets

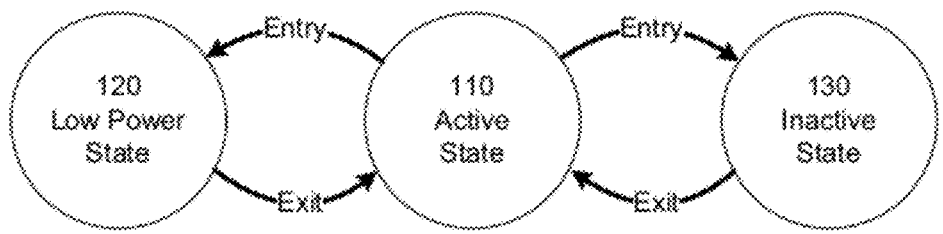
100    FIG. 1
| 210 Payload description | 220 Size(MB) | 230 Cmpr. time (s) | 240 Decmpr. time (s) |
|---|---|---|---|
| Operating system in idle mode | 3072 | 8.883 | 3.382 |
| Operating system with light loading | 3072 | 14.494 | 6.384 |
| Operating system with moderate loading | 3072 | 21.142 | 9.260 |
| Operating system with heavy loading | 3072 | 22.192 | 9.735 |
|  |  | 260 Write time(s) | 270 Read time(s) |
| Access data rate from non-volatile memory | 3072 | 9.332 | 9.332 |
200    FIG. 2

SYSTEM CONTEXT SAVING BASED ON COMPRESSION/DECOMPRESSION TIME

FIELD OF THE INVENTION

This invention relates to a platform, and more specifically but not exclusively, to a method and apparatus for improving the resume time of the platform.

BACKGROUND DESCRIPTION

With the technological advances in mass storage devices, the Input/Output (I/O) data rates are getting faster and faster. Faster I/O data rates allow a platform to have faster boot up time and resume time.

If there are any components in the platform that are unable to keep up with the I/O data rates, this may cause a bottleneck in the performance of the platform.

BRIEF DESCRIPTION OF THE DRAWINGS

The features and advantages of embodiments of the invention will become apparent from the following detailed description of the subject matter in which:

FIG. 1 illustrates a diagram of the power states of a platform in accordance with one embodiment of the invention;

FIG. 2 illustrates a table of data access rates in accordance with one embodiment of the invention;

DETAILED DESCRIPTION

Figure 3:
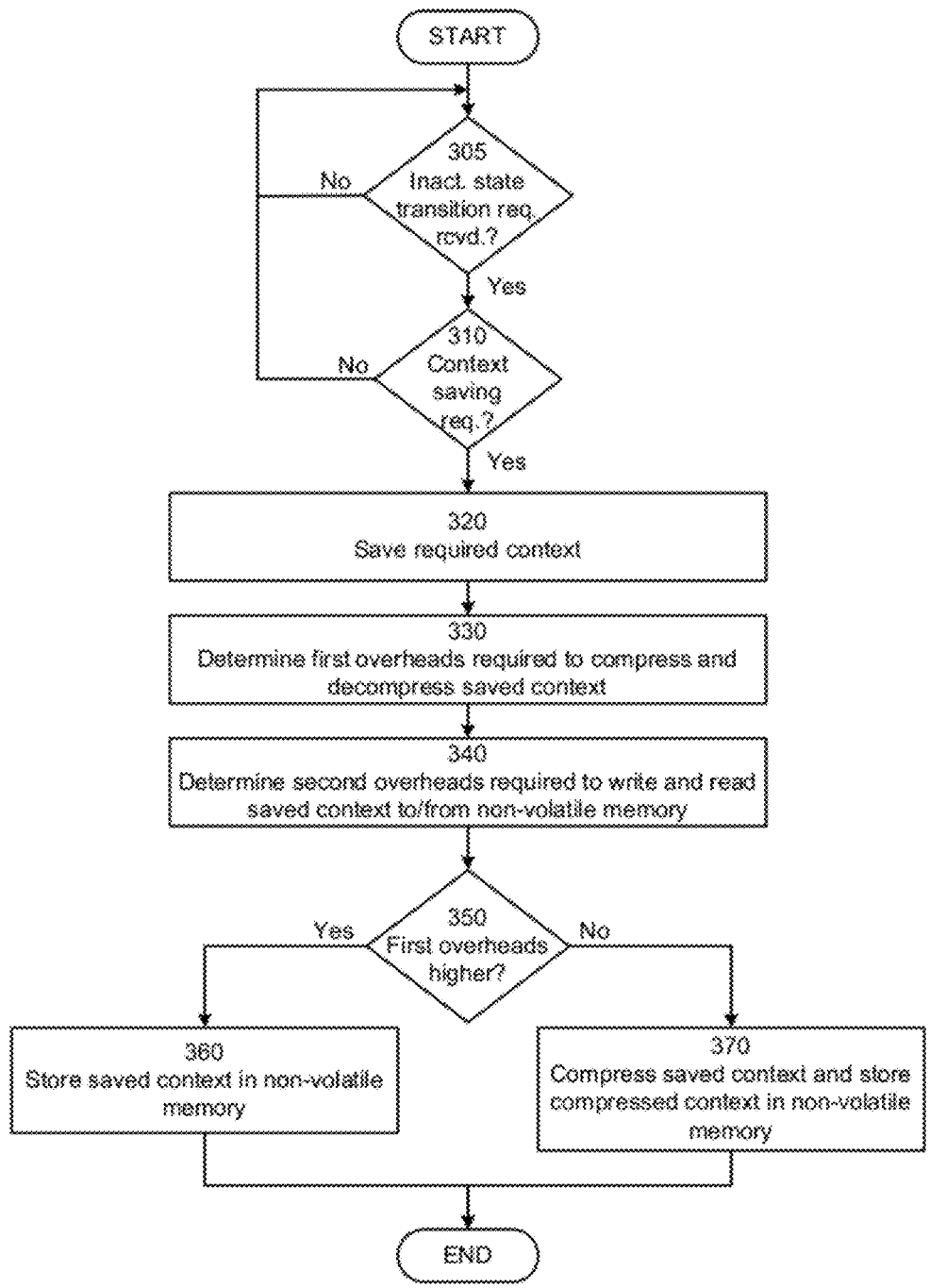
FIG. 3 illustrates a flow chart of an algorithm in accordance with one embodiment of the invention.

Embodiments of the invention described herein are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference numerals have been repeated among the figures to indicate corresponding or analogous elements. Reference in the specification to "one embodiment" or "an embodiment" of the invention means that a particular feature, structure, or characteristic described in connection with the embodiment is included in at least one embodiment of the invention. Thus, the appearances of the phrase "in one embodiment" in various places throughout the specification are not necessarily all referring to the same embodiment.

Embodiments of the invention provide a method and apparatus for improving the resume time of a platform. In one embodiment of the invention, the context of the platform is saved prior to entering an inactive state of the platform. When the platform is switched back to an active state, it reads the saved context and restores the platform to its original state prior to entering the inactive state. In one embodiment of the invention, the platform determines whether it should compress the saved context before storing it in a non-volatile memory based on the operating condition of the platform. This allows the platform to select the optimum method to allow faster resume time of the platform.

The platform includes, but is not limited to, a desktop computer, a laptop computer, a netbook, a tablet computer, a notebook computer, a personal digital assistant (PDA), a server, a workstation, a cellular telephone, a mobile computing device, an Internet appliance or any other type of computing device. The context of the platform includes, but is not limited to, cache memory state information, processor state information, memory state information, register file state information, device state information and any other information that needs to be restored after resuming from an inactive state of the platform.

FIG. 1 illustrates a diagram 100 of the power states of a platform in accordance with one embodiment of the invention. The platform has different power consumption levels to allow for different usage scenarios of the platform in one embodiment of the invention. The platform has an active state 100 where all the components of the platform are fully operational. The active state 100 illustrates a usage scenario where no power savings are required in one embodiment of the invention.

When the platform is powered by a battery, for example, the platform can lower its power consumption level by changing from the active state 100 to the low power state 120. In the low power state 120, one or more components of the platform are disabled to lower the power consumption of the platform in one embodiment of the invention. In another embodiment of the invention, one or more components of the platform are operating with reduced power requirements. For example, in one embodiment of the invention, the processor of the platform in the lower power state 120 operates with a clock frequency slower than when it is in the active state 110. This allows the power consumption of the platform to be reduced.

In one embodiment of the invention, the platform enters an inactive state 130 from the active state 110. The inactive state 110 includes, but is not limited to, a sleep state, a standby state, a hibernate state and the like. In one embodiment of the invention, the inactive state 130 has more than one state that indicates the desired mode of the platform. For example, in one embodiment of the invention, the platform is compliant with the Advanced Configuration and Power Interface (ACPI) specification (ACPI specification, "Advanced Configuration and Power Interface Specification", Revision 4.0a, published 5 Apr. 2010). When the platform is compliant with the ACPI specification, the inactive state 110 denotes the system 1-4 (S1-4) sleeping states in one embodiment of the invention.

When the inactive state 130 requires saving of the context of the platform, the platform saves the context of the platform into a hibernation file in one embodiment of the invention. The platform has logic to select the optimum method to store the hibernation file in a non-volatile memory so that the resume time of the platform is reduced in one embodiment of the invention. The platform determines a first overhead time to compress and decompress the hibernation file based on the operating condition of the platform. The platform determines a second overhead time to write and read the hibernation file to and from a non-volatile memory. The platform compares the first overhead time with the second overhead time to determine whether the hibernation file should be compressed before writing it to the non-volatile memory.

If the first overhead time is higher than the second overhead time, i.e., it is faster to write and read the hibernation file to and from the non-volatile memory, the platform does not perform any compression on the hibernation file and copies or stores the hibernation file in the non-volatile memory. If the second overhead time is higher than the first overhead time, i.e., it is slower to write and read the hibernation file to and from the non-volatile memory, the platform performs a compression operation to reduce the size of the hibernation file and copies or stores the compressed hibernation file in the non-volatile memory.

In one embodiment of the invention, the logic of the platform is implemented as a firmware that executes on the platform whenever a request to enter the inactive state 130 is received. In another embodiment of the invention, the logic of the platform is implemented as a Basic IO system (BIOS) firmware. One of ordinary skill in the relevant art will readily appreciate that the logic of the platform may reside in any component of the platform without affecting the workings of the invention.

The diagram 100 of the power states of a platform is not meant to be limiting and more power states of the platform can be added or removed without affecting the workings of the invention.

FIG. 2 illustrates a table of data access rates in accordance with one embodiment of the invention. FIG. 2 illustrates an example of the same data payload that is compressed and decompressed under different operating conditions of the platform. The payload represents a hibernation file in one embodiment of the invention.

For example, in one embodiment of the invention, when the operating system of the platform is in an idle mode, i.e., very few or no applications are using the resources of the platform, the platform requires 8.883 seconds to compress a data payload of 3072 megabytes (MB). The compressed data payload can be decompressed in 3.382 seconds under the same operating condition of the platform. FIG. 2 also illustrates the respective compression and decompression time when the operation system of the platform is under light loading, moderate loading and heavy loading respectively.

The time required for writing or reading the same data payload of 3072 MB to and from a non-volatile memory such as a Dynamic Random Access Memory (DRAM) based Solid State Drive is 9.332 seconds. The writing time of the payload to the non-volatile memory is faster than the compression time needed to compress the payload when the operating system of the platform has light, moderate and heavy loading. In these operating conditions of the platform, the performance of the platform can be improved by writing the payload directly to the non-volatile memory without performing a compression of the payload.

The reading time of the payload from the non-volatile memory is faster than the decompression time needed to decompress the payload when the operating system of the platform has heavy loading. In this operating condition of the platform, the performance of the platform can be improved by reading the payload directly from the non-volatile memory without performing a decompression of the payload.

In one embodiment of the invention, the platform determines whether the hibernation file should be compressed before writing it to the non-volatile memory based on the comparison of both the compression and decompression times at the current operating condition with the write and read data rate of the non-volatile memory. In another embodiment of the invention, the platform determines whether the hibernation file should be compressed before writing it to the non-volatile memory based on the comparison of the compression time at the current operating condition with the write data rate of the non-volatile memory. In yet another embodiment of the invention, the platform determines whether the hibernation file should be compressed before writing it to the non-volatile memory based on the comparison of the decompression time at the current operating condition with the read data rate of the non-volatile memory.

One of ordinary skill will appreciate other methods of deciding whether the hibernation file should be compressed before writing it to the non-volatile memory can be used without affecting the workings of the invention. FIG. 2 illustrates a measurement of time as a comparison but it is not meant to be limiting. In another embodiment of the invention, the I/O throughput (MB/s) is used as the measurement unit for comparison. One of ordinary skill will appreciate other parameters of the platform can be used as a method of deciding whether the hibernation file should be compressed before writing it to the non-volatile memory. These other parameters can be used without affecting the workings of the invention and shall not be described herein.

FIG. 3 illustrates a flow chart 300 of an algorithm in accordance with one embodiment of the invention. In step 305, the flow 300 checks if an inactive state transition request has been received. If no, the flow 300 goes back to the step 305. In one embodiment of the invention, when the platform is compliant with the ACPI specification, the step 305 checks whether the sleep enable (SLP_EN) bit is asserted. The SLP_EN bit indicates that the platform is required to transition to one of the S1-S4 sleeping states.

If yes, the flow 300 goes to step 310 and checks if the desired inactive state requires saving of the context of the platform. In one embodiment of the invention, when the platform is compliant with the ACPI specification, the step 310 checks the setting of the sleep type x (SLP_TYPx) bits. The SLP_TYPx bits indicate the desired type of the sleep state, i.e., whether it is S1, S2, S3 or S4 sleeping state, of the platform. In one embodiment of the invention, when the desired inactive state is set as the S3 or S4 sleeping state, context saving of the platform is required. One of ordinary skill in the relevant art will readily appreciate other system states of the platform may also require context saving of the platform and these other system states can be checked in step 310 in one embodiment of the invention.

If the desired inactive state does not require context saving of the platform in step 310, the flow 300 goes back to step 305. If the desired inactive state does require context saving of the platform in step 310, the flow 300 goes back to step 320. In step 320, the flow 320 saves the required context of the platform based on the requirements of the inactive state. For example, in one embodiment of the invention, when the platform is compliant with the ACPI specification and the desired sleeping state set as the S4 sleeping state, one of ordinary skill in the relevant will readily appreciate which information of the platform is required to be saved based on the ACPI specification. In one embodiment of the invention, the required context is saved into a hibernation file or any other suitable format as required by the operating system of the platform.

In step 330, the flow 300 determines the first overheads required to compress and decompress the saved context. In one embodiment of the invention, step 330, the step 330 determines the first overheads required to compress and decompress the hibernation file. In step 340, the flow 300 determines the second overheads required to write and read the saved context to and from the non-volatile memory or storage device.

The first and the second overheads are measured in units such as, but not limited to, time, I/O throughput as megabytes per second, and any other suitable units. In one embodiment of the invention, the steps 330 and 340 measure only the overheads for compression and write operation of the saved context respectively. In another embodiment of the invention, the steps 330 and 340 measure only the overheads for decompression and read operation of the saved context respectively. In yet another embodiment of the invention, step 340 is performed only once during the boot up of the platform when the non-volatile memory is initialized.

In step 350, the flow 300 checks if the first overheads are higher than the second overheads. If yes, i.e., it is faster to write and read the saved context to and from the non-volatile memory, the flow 300 goes to step 360 and stores the saved context in the non-volatile memory and the flow 300 ends. If no, i.e., it is slower to write and read the saved context to and from the non-volatile memory, the flow 300 goes to step 370. In step 370, the flow 300 compresses the saved context and stores the compressed context in the non-volatile memory and the flow 300 ends.

Figure 4:
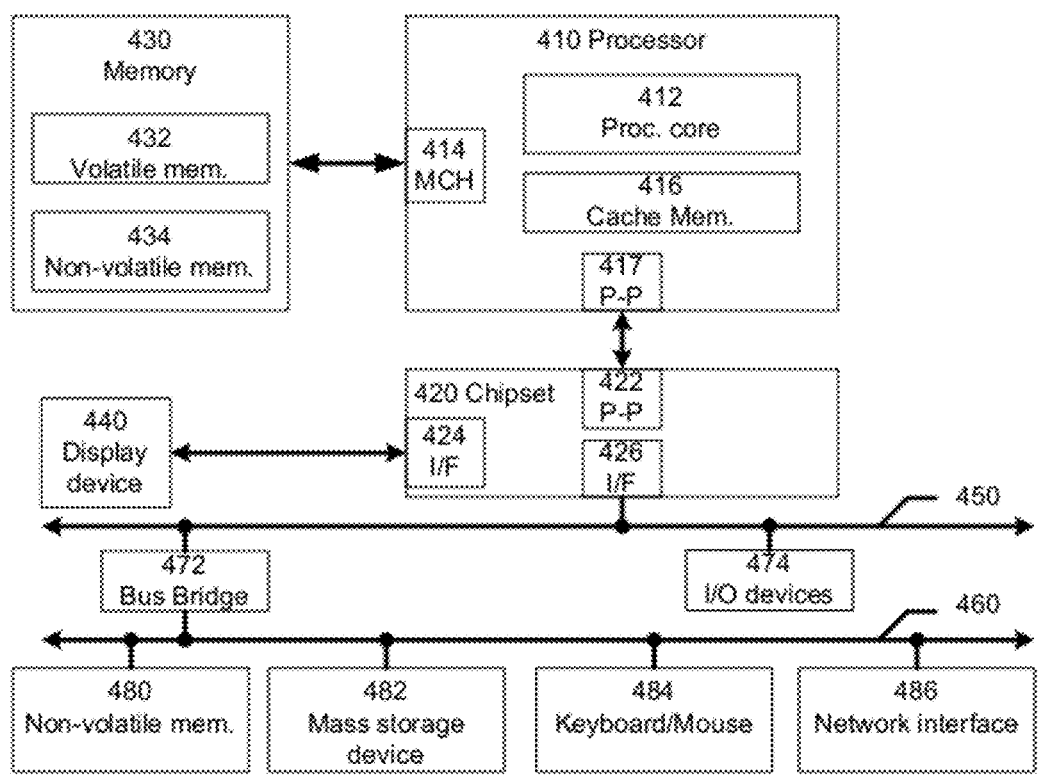
FIG. 4 illustrates a system in accordance with one embodiment of the invention.

FIG. 4 illustrates a system in accordance with one embodiment of the invention. The system 400 includes, but is not limited to, a desktop computer, a laptop computer, a netbook, a notebook computer, a personal digital assistant (PDA), a server, a workstation, a cellular telephone, a mobile computing device, an Internet appliance or any other type of computing device. In another embodiment, the system 400 used to implement the methods disclosed herein may be a system on a chip (SOC) system.

The processor 410 has a processing core 412 to execute instructions of the system 400. The processing core 412 includes, but is not limited to, pre-fetch logic to fetch instructions, decode logic to decode the instructions, execution logic to execute instructions and the like. The processor 410 has a cache memory 416 to cache instructions and/or data of the system 400. In another embodiment of the invention, the cache memory 416 includes, but is not limited to, level one, level two and level three, cache memory or any other configuration of the cache memory within the processor 410.

The memory control hub (MCH) 414 performs functions that enable the processor 410 to access and communicate with a memory 430 that includes a volatile memory 432 and/or a non-volatile memory 434. The volatile memory 432 includes, but is not limited to, Synchronous Dynamic Random Access Memory (SDRAM), Dynamic Random Access Memory (DRAM), RAMBUS Dynamic Random Access Memory (RDRAM), and/or any other type of random access memory device. The non-volatile memory 434 includes, but is not limited to, NAND flash memory, NOR flash memory, phase change memory (PCM), read only memory (ROM), electrically erasable programmable read only memory (EEPROM), or any other type of non-volatile memory device.

The memory 430 stores information and instructions to be executed by the processor 410. The memory 430 may also stores temporary variables or other intermediate information while the processor 410 is executing instructions. The chipset 420 connects with the processor 410 via Point-to-Point (PtP) interfaces 417 and 422. The chipset 420 enables the processor 410 to connect to other modules in the system 400. In one embodiment of the invention, the interfaces 417 and 422 operate in accordance with a PtP communication protocol such as the Intel® QuickPath Interconnect (QPI) or the like. The chipset 420 connects via the interface 424 to a display device 440 that includes, but is not limited to, liquid crystal display (LCD), cathode ray tube (CRT) display, or any other form of visual display device.

In addition, the chipset 420 connects via the interface 426 to one or more buses 450 and 460 that interconnect the various modules 474, 480, 482, 484, and 486. Buses 450 and 460 may be interconnected together via a bus bridge 472 if there is a mismatch in bus speed or communication protocol. The chipset 420 couples with, but is not limited to, a non-volatile memory 480, a mass storage device(s) 482, a keyboard/mouse 484 and a network interface 486. The non-volatile memory 480 includes, but is not limited to, a NAND flash solid state drive (SSD), a NOR flash SSD, a Dynamic Random Access Memory (DRAM) based SSD, a Phase-Change Memory (PCM) SSD and the like.

The mass storage device 482 includes, but is not limited to, a solid state drive, a hard disk drive, an universal serial bus flash memory drive, or any other form of computer data storage medium. The network interface 486 is implemented using any type of well known network interface standard including, but not limited to, an Ethernet interface, a universal serial bus (USB) interface, a Peripheral Component Interconnect (PCI) Express interface, a wireless interface and/or any other suitable type of interface. The wireless interface operates in accordance with, but is not limited to, the IEEE 802.11 standard and its related family, Home Plug AV (HPAV), Ultra Wide Band (UWB), Bluetooth, WiMax, or any form of wireless communication protocol.

While the modules shown in FIG. 4 are depicted as separate blocks within the system 400, the functions performed by some of these blocks may be integrated within a single semiconductor circuit or may be implemented using two or more separate integrated circuits. For example, although the cache memory 416 is depicted as a separate block within the processor 410, the cache memory 416 can be incorporated into the processor core 412 respectively. The system 400 may include more than one processor/processing core in another embodiment of the invention. The saved context or compressed context of the system 400 can be stored in the non-volatile memory 434, mass storage device 482, and the non-volatile memory 480 in one embodiment of the invention.

Although examples of the embodiments of the disclosed subject matter are described, one of ordinary skill in the relevant art will readily appreciate that many other methods of implementing the disclosed subject matter may alternatively be used. In the preceding description, various aspects of the disclosed subject matter have been described. For purposes of explanation, specific numbers, systems and configurations were set forth in order to provide a thorough understanding of the subject matter. However, it is apparent to one skilled in the relevant art having the benefit of this disclosure that the subject matter may be practiced without the specific details. In other instances, well-known features, components, or modules were omitted, simplified, combined, or split in order not to obscure the disclosed subject matter.

The term "is operable" used herein means that the device, system, protocol etc, is able to operate or is adapted to operate for its desired functionality when the device or system is in off-powered state. Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

The techniques shown in the figures can be implemented using code and data stored and executed on one or more computing devices such as general purpose computers or computing devices. Such computing devices store and communicate (internally and with other computing devices over a network) code and data using machine-readable media, such as machine readable storage media (e.g., magnetic disks; optical disks; random access memory; read only memory; flash memory devices; phase-change memory) and machine readable communication media (e.g., electrical, optical, acoustical or other form of propagated signals—such as carrier waves, infrared signals, digital signals, etc.).

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

What is claimed is:

1. A method comprising:
saving context of a platform into a hibernation file;
determining a first overhead time to compress and decompress the hibernation file based on an operating condition of the platform;
determining a second overhead time to write and read the hibernation file to and from a non-volatile memory; and
writing the hibernation file to the non-volatile memory in response to a determination that the first overhead time is higher than the second overhead time.

2. The method of claim 1, further comprising:
receiving an indication to switch the platform to an inactive state; and
determining whether the inactive state requires saving of context of the platform; and wherein saving the context of the platform into the hibernation file comprises:
saving the context of the platform into the hibernation file in response to a determination that the inactive state requires saving of the context of the platform.

3. The method of claim 1, further comprising:
in response to a determination that the second overhead time is higher than the first overhead time, compressing the hibernation file and writing the compressed hibernation file to the non-volatile memory.

4. The method of claim 1, wherein the context of the platform comprises one or more of cache memory state information, processor state information, memory state information, register file state information and device state information.

5. The method of claim 2, wherein the platform is compliant with the Advanced Configuration and Power Interface (ACPI) specification.

6. The method of claim 5, wherein the inactive state is a system 3 (S3) sleeping state or a S4 sleeping state.

7. The method of claim 1, wherein the non-volatile memory comprises one of a NAND flash solid state drive (SSD), a NOR flash SSD, a Dynamic Random Access Memory (DRAM) based SSD, Phase-Change Memory (PCM) SSD.

8. An apparatus comprising:
a processor having one or more cache memories;
a main memory coupled with the processor;
a non-volatile memory coupled with the processor; and
logic to:
receive a state transition request, wherein the state transition request requires saving of system context of the apparatus;
save the system context of the apparatus; and
compare a first determined Input/Output (I/O) throughput of compressing and decompressing the saved system context with a second determined I/O throughput of writing and reading the saved system context to and from the non-volatile memory.

9. The apparatus of claim 8, wherein the logic is further to:
store the saved system context in the non-volatile memory in response to a comparison that the first determined I/O throughput is higher than the second determined I/O throughput.

10. The apparatus of claim 8, wherein the logic is further to:
compress the saved system context and store the compressed system context in the non-volatile memory in response to a comparison that the second determined I/O throughput is higher than the first determined I/O throughput.

11. The apparatus of claim 8, wherein the logic to receive the state transition request comprises:
determine that a sleep enable (SLP_EN) bit is activated; and
determine that sleep type (SLP_TYPx) bits are set to indicate a sleep state that requires saving of the system context of the apparatus.

12. The apparatus of claim 8, wherein the system context of the apparatus comprises one or more of, state information of each of the one or more cache memories, state information of the processor, state information of the main memory, and state information of one or more devices coupled with the apparatus.

13. The apparatus of claim 8, wherein the apparatus is compliant with the Advanced Configuration and Power Interface (ACPI) specification.

14. The apparatus of claim 8, wherein the non-volatile memory comprises one of a NAND flash solid state drive (SSD), a NOR flash SSD, a Dynamic Random Access Memory (DRAM) based SSD, Phase-Change Memory (PCM) SSD.

15. A non-transitory computer readable medium having instructions stored thereon which, when executed, cause a platform to perform the following method:
saving context of the platform into a hibernation file;
determining a first overhead time to compress and decompress the hibernation file based on an operating condition of the platform;
determining a second overhead time to write and read the hibernation file to and from a non-volatile memory; and
writing the hibernation file to the non-volatile memory in response to a determination that the first overhead time is higher than the second overhead time.

16. The non-transitory computer readable medium of claim 15, further comprising:
receiving an indication to switch the platform to an inactive state; and
determining whether the inactive state requires saving of context of the platform; and wherein saving the context of the platform into the hibernation file comprises:
saving the context of the platform into the hibernation file in response to a determination that the inactive state requires saving of the context of the platform.

17. The non-transitory computer readable medium of claim 15, further comprising:
in response to a determination that the second overhead time is higher than the first overhead time, compressing the hibernation file and writing the compressed hibernation file to the non-volatile memory.

18. The non-transitory computer readable medium of claim 15, wherein the context of the platform comprises one or more of cache memory state information, processor state information, memory state information, register file state information and device state information.

19. The non-transitory computer readable medium of claim 16, wherein the platform is compliant with the Advanced Configuration and Power Interface (ACPI) specification.

20. The non-transitory computer readable medium of claim 19, wherein the inactive state is a system 3 (S3) sleeping state or a S4 sleeping state.

21. The non-transitory computer readable medium of claim 15, wherein the non-volatile memory comprises one of a NAND flash solid state drive (SSD), a NOR flash SSD, a Dynamic Random Access Memory (DRAM) based SSD, Phase-Change Memory (PCM) SSD.

* * * * *